United States Patent
Wizelman et al.

(10) Patent No.: US 7,236,843 B1
(45) Date of Patent: Jun. 26, 2007

(54) METHOD AND APPARATUS FOR SCHEDULING WORK IN A FABRICATION FACILITY

(75) Inventors: David Wizelman, Austin, TX (US); Tony Baker, Dripping Spring, TX (US); Cabe Nicksic, Austin, TX (US)

(73) Assignee: Spansion, LLC., Sunnyvale, CA (US)

( * ) Notice: Subject to any disclaimer, the term of this patent is extended or adjusted under 35 U.S.C. 154(b) by 26 days.

(21) Appl. No.: 11/185,388

(22) Filed: Jul. 20, 2005

(51) Int. Cl.
*G06F 19/00* (2006.01)

(52) U.S. Cl. .......................... 700/100; 700/121; 705/8

(58) Field of Classification Search .................. 700/29, 700/99–101, 103, 104, 121; 705/8

See application file for complete search history.

(56) References Cited

U.S. PATENT DOCUMENTS

| | | | | |
|---|---|---|---|---|
| 5,140,537 A | * | 8/1992 | Tullis ............................ | 703/6 |
| 5,586,021 A | * | 12/1996 | Fargher et al. ............. | 700/100 |
| 5,826,040 A | * | 10/1998 | Fargher et al. ................ | 705/8 |
| 6,963,785 B2 | * | 11/2005 | Chen et al. .................. | 700/100 |
| 7,039,484 B2 | * | 5/2006 | Daferner ..................... | 700/108 |

* cited by examiner

*Primary Examiner*—Leo Picard
*Assistant Examiner*—Douglas S Lee
(74) *Attorney, Agent, or Firm*—Williams, Morgan & Amerson, P.C.

(57) ABSTRACT

A method and apparatus for scheduling work in a semiconductor fabrication facility is provided. The method includes determining a time period associated with processing of at least one wafer, determining at least one due time associated with processing of the at least one wafer, and scheduling the at least one wafer for processing based on the time period and the at least one due time.

26 Claims, 6 Drawing Sheets

|  | WIP | | Arrival | Days | | Activities | | | | |
| --- | --- | --- | --- | --- | --- | --- | --- | --- | --- | --- |
| MODULE | CURR | BOH | 4HR | Behind | PLAN | ROD | ACT | ROD REM | %REQ | %PACE |
| ADI | 4062 | 3620 | 7787 | -2.53 | 47887 | 47812 | 40751 | 14728 | 69 | 88 |
| CFM | 2044 | 2821 | 7046 | -2.94 | 57345 | 55879 | 54257 | 11104 | 80 | 99 |
| DIFFUSION | 17046 | 16001 | 6518 | -3.87 | 28909 | 28359 | 25877 | 7206 | 75 | 90 |
| ETCH | 11462 | 13447 | 12820 | -2.90 | 59766 | 58037 | 54699 | 10843 | 81 | 96 |
| IMPLANT | 14651 | 12997 | 10739 | -2.63 | 50325 | 49830 | 43477 | 11898 | 76 | 88 |
| MASKING | 12538 | 11222 | 4561 | -2.27 | 17820 | 17745 | 15538 | 4307 | 76 | 90 |
| OTHER | 27 | 27 | 575 | 0.00 | 1901 | 1501 | 1375 | 928 | 38 | 54 |
| POLISH | 3893 | 4390 | 10289 | -0.68 | 37261 | 28562 | 30033 | 3279 | 89 | 106 |
| THIN FILMS | 16475 | 16570 | 5505 | -0.46 | 33554 | 29732 | 26894 | 5844 | 80 | 92 |
|  | 82198 | 81095 | 65840 | -2.42 | 334768 | 317457 | 292901 | 70137 | 78 | 93 |

Figure 3

METHOD AND APPARATUS FOR SCHEDULING WORK IN A FABRICATION FACILITY

BACKGROUND OF THE INVENTION

1. Field of the Invention

This invention relates generally to semiconductor fabrication, and, more particularly, to scheduling work in a fabrication facility.

2. Description of the Related Art

A variety of processing tools are used to fabricate a semiconductor device. The processing tools may include photolithography steppers, etch tools, deposition tools, polishing tools, rapid thermal processing tools, ion implantation tools, and the like. Wafers (or wafer lots) are processed in the tools in a predetermined order and each processing tool modifies the wafers according to a particular operating recipe. For example, a photolithography stepper may be used to form a patterned layer of photoresist (i.e. a mask) above a dielectric layer that has been deposited above the wafer. Features in the patterned layer of photoresist correspond to a plurality of features, e.g. gate electrode structures, which will ultimately be formed above the surface of the wafer. The wafer is then provided to an etch tool that etches away portions of the dielectric layer corresponding to features in the mask to form the plurality of features above the surface of the wafer.

Shop floor work-in-process (WIP) management tools may be used to coordinate operations of the processing tools. Conventional shop floor work-in-process management tools usually include tools for scheduling processing of wafers by the various processing tools. For example, a shop floor work-in-process management tool may include a dispatching tool that determines which wafers should be provided to which processing tools. The dispatching tool typically makes dispatching decisions based on the current state of the processing tools and/or the wafers that are to be processed. However, conventional dispatching tools do not provide information regarding upcoming work that may be performed on wafers by the processing tools. Consequently, conventional dispatching tools do not provide information that may allow the shop floor work-in-process management tools to prepare for future work.

Conventional shop floor work-in-process management tools may also include tools for reporting information related to the processing of the wafers and reviewing the performance of the processing tools. For example, the shop floor work-in-process management tool may include tools for measuring and reporting one or more factory performance metrics associated with processing of the wafers. However, the factory performance metrics are typically determined independent of other operations carried out by other portions of the shop floor work-in-process management tool, such as the dispatching decisions made by the dispatching tool. Thus, the shop floor work-in-process management tool is not generally able to compare the performance of the processing tools to the requests made by other parts of the shop floor work-in-process management tools. For example, the performance metrics generally do not measure compliance with the dispatching decisions made by the dispatching tool.

Plant managers and/or engineers on the shop floor may override the shop floor work-in-process management tool. For example, an experienced engineer may be able to anticipate a problem with one of the processing tools, and may, therefore, override a dispatching tool's request to process wafers in the problematic processing tool. However, even the most experienced engineer and/or plant manager may not be able to anticipate the consequences of overriding a request on the operation of the entire shop floor and/or the performance metrics used to assess the performance of the fabrication facility. Accordingly, even though manual overrides may improve the performance of portions of the fabrication facility, they may degrade the overall performance of the fabrication facility, at least in part because the conventional shop floor work-in-process management tools may not be able to compensate for system-wide effects of the manual overrides.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for scheduling work in a semiconductor fabrication facility. The method includes determining a time period associated with processing of at least one wafer, determining at least one due time associated with processing of the at least one wafer, and scheduling the at least one wafer for processing based on the time period and the at least one due time.

In another embodiment of the instant invention, an apparatus is provided for scheduling work in a semiconductor fabrication facility. The apparatus includes a management unit configured to determine a time period associated with processing of at least one wafer, determine at least one due time associated with processing of the at least one wafer, and schedule the at least one wafer for processing based on the time period and the at least one due time.

BRIEF DESCRIPTION OF THE DRAWINGS

The invention may be understood by reference to the following description taken in conjunction with the accompanying drawings, in which like reference numerals identify like elements, and in which:

FIG. 3 conceptually illustrates one exemplary embodiment of a status report, in accordance with the present invention;

Figure 1:
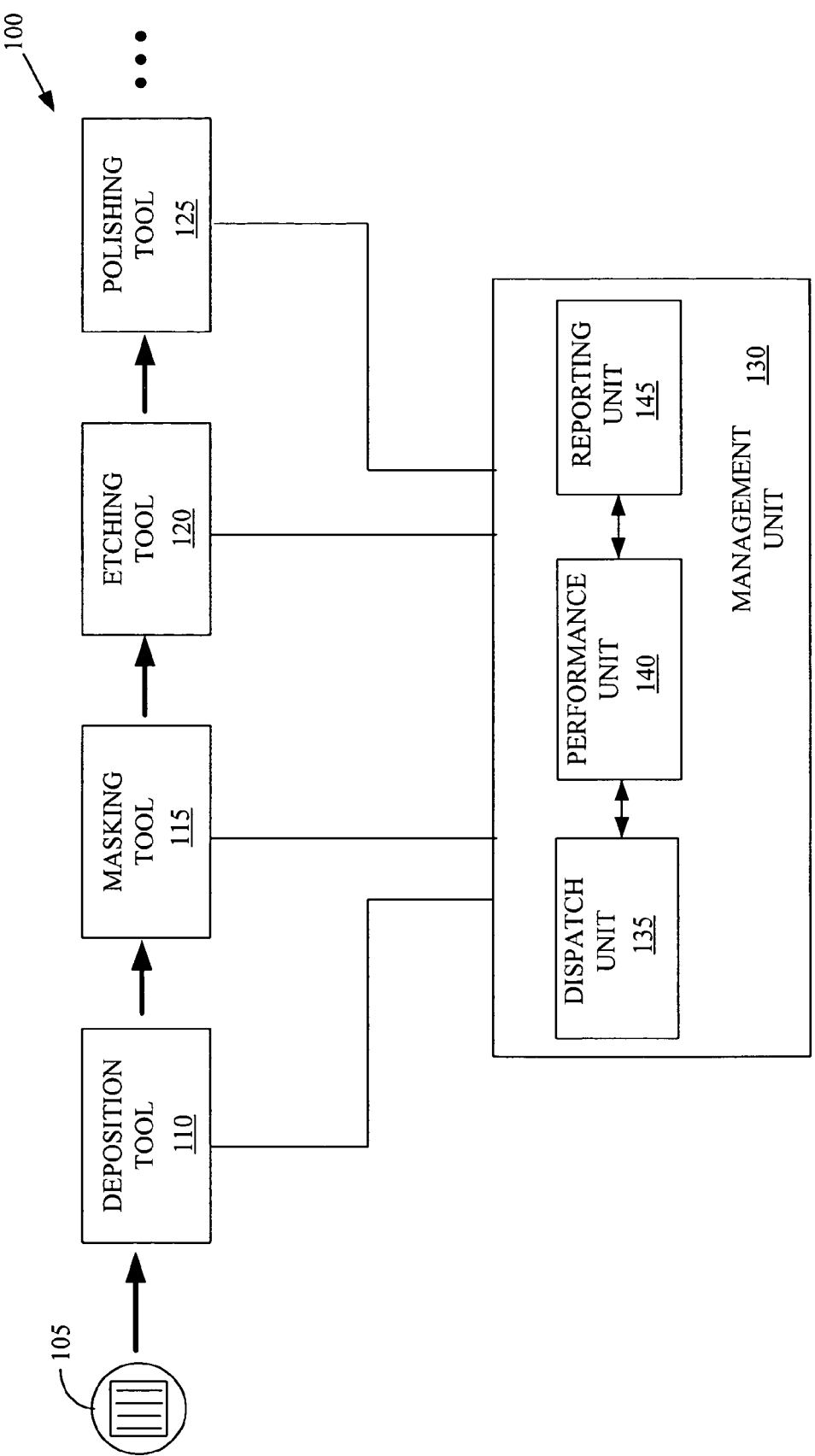
FIG. 1 shows a simplified block diagram of an illustrative manufacturing system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 shows a simplified block diagram of an illustrative manufacturing system 100. In the illustrated embodiment, the manufacturing system 100 is adapted to fabricate semiconductor devices on one or more wafers 105. Although a single wafer 105 is shown in FIG. 1, persons of ordinary skill in the art should appreciate that the wafer 105 may be representative of a single wafer 105, a plurality of wafers 105, a wafer lot, and/or a plurality of wafer lots (e.g., one or more batches of wafers and/or wafer lots). Furthermore, the wafer 105 may be substantially unprocessed or may have been previously processed. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other similar devices. The techniques may also be applied to workpieces or manufactured items other than semiconductor devices.

In the illustrated embodiment, the wafer 105 may be provided to one or more of a plurality of processing tools, which may include a deposition tool 110, a masking tool 115, an etching tool 120, and a polishing tool 125. However, persons of ordinary skill in the art having benefit of the present disclosure should appreciate that more or fewer processing tools, as well as more or fewer types of processing tool, may be used to process the wafer 105 (or other wafers) in the present invention. For example, the manufacturing system 100 may include an ion implantation tool. In alternative embodiments, each of the processing tools 110, 115, 120, 125 may be a standalone tool configured to perform a single processing task, such as deposition, lithography, masking, etching, ion implantation, or polishing, or it may be an integrated tool that is configured to perform multiple processing tasks. For example, one or more of the processing tools 110, 115, 120, 125 may include a plurality of chambers for performing a plurality of processing tasks. Furthermore, each of the processing tools 110, 115, 120, 125 may represent tool sets and/or station families that include a plurality of tools for performing a similar type of operation. For example, the deposition tool 110 may represent a tool set or a station family including a plurality of deposition tools 110 for performing deposition operations.

The manufacturing system 100 may also include one or more measurement tools (not shown). Exemplary measurement tools include, but are not limited to, metrology tools (such as scatterometers and ellipsometers) and wafer electrical test tools. The measurement tools may be standalone tools and/or integrated tools. Moreover, in some embodiments, the measurement tools may be integrated with one or more of the processing tools 110, 115, 120, 125. The wafer 105 may be provided to the measurement tool(s) before, during, and/or after processing by one or more of the processing tools 110, 115, 120, 125. The measurement tool(s) may measure one or more parameters associated with processing of the wafer 105 by the processing tools 110, 115, 120, 125, as well as any other processing that may have been performed on the wafer 105. For example, the measurement tool(s) may include a metrology tool for measuring physical parameters of features formed on the wafer 105, such as layer thicknesses, profiles and/or critical dimensions of features formed on the wafer 105, depths of vias and/or trenches formed on the wafer 105, and the like. For another example, the measurement tool(s) may include a wafer electrical test tool for measuring electrical parameters of features formed on the wafer, such as voltages, currents, and the like.

The manufacturing system 100 includes a management unit 130. In the illustrated embodiment, the management unit 130 is a shop floor work-in-process management unit 130 that includes a dispatch unit 135, a performance unit 140, and a reporting unit 145. In operation, the management unit 130 may determine a time period during which the wafer 105 may be processed by one or more of the processing tools 110, 115, 120, 125. For example, the performance unit 140 in the management unit 130 may select a 12-hour shift as the time period for processing the wafer 105. The management unit 130 may also determine one or more due times associated with a wafer 105. For example, the management unit 130 may determine a due time for a deposition operation performed on the wafer 105, a due time for a masking operation to be performed on the wafer 105, a due time for an etching operation to be performed on the wafer 105, a due time for a polishing operation to be performed on the wafer, and the like. The management unit 130 may then schedule the wafer 105 for processing by one or more of the processing tools 110, 115, 120, 125 based on one or more of the due times associated with the wafer 105 and the time period for processing. For example, the management unit 130 may schedule the wafer 105 for processing if the due time falls in the time period for processing.

The dispatch unit 135 may provide signals and/or information that may be used to dispatch one or more wafers 105 to one or more of the processing tools 110, 115, 120, 125. In one embodiment, the dispatch unit 135 generates the signals and/or information based upon one or more of the due times associated with the wafer 105 and the time period for processing. For example, the dispatch unit 135 may generate signals and/or information that may be used to provide the wafer 105 to one or more of the processing tools 110, 115, 120, 125 according to the schedule or plan generated by the management unit 130. The wafer 105 may then be processed by one or more of the processing tools 110, 115, 120, 125 in the manner indicated by the signals and/or information provided by the dispatch unit 135.

The performance unit 140 may determine activity goals for processing the wafer 105 (or other wafers) during the determined time period using one or more of the processing tools 110, 115, 120, 125. As used herein, the term "activity goal" should be understood to mean a number of operations performed by one or more of the processing tools 110, 115, 120, 125 on one or more wafers 105. For example, if the deposition tool 110 is configured to deposit a single layer on the wafer 105, an activity goal for the deposition tool 110 may indicate a number of wafers 105 to be processed by the deposition tool. For another example, if one of the processing tools 110, 115, 120, 125 includes multiple chambers for performing multiple operations on the wafer 105, then an activity goal for this tool may indicate a number of wafers 105 to be processed by the tool and/or a number of operations to be carried out by the tool. As discussed above, activity goals may also be associated with tool sets, station families, modules, and/or other groupings of the processing tools 110, 115, 120, 125. In one embodiment, the activity goals are determined based on the schedule and/or plan formed by the management unit 130.

The performance unit 140 may also be configured to determine one or more performance metrics associated with processing of the wafer 105 by one or more of the processing tools 110, 115, 120, 125. In one embodiment, the performance metrics may be determined based on the activity goals. The performance unit 140 may also use the performance metric to assess the quality of the performance of one or more of the processing tools 110, 115, 120, 125. For example, the performance unit 140 may compare a target or threshold value of the performance metric to an actual value of the performance metric that is determined using information collected from the processing tools 110, 115, 120, 125 before, during, and/or after processing of the wafer 105. The reporting unit 145 may provide information indicative of the assessment. For example, the reporting unit 145 may provide a report to a shift engineer and/or shop floor manager.

Figure 2:
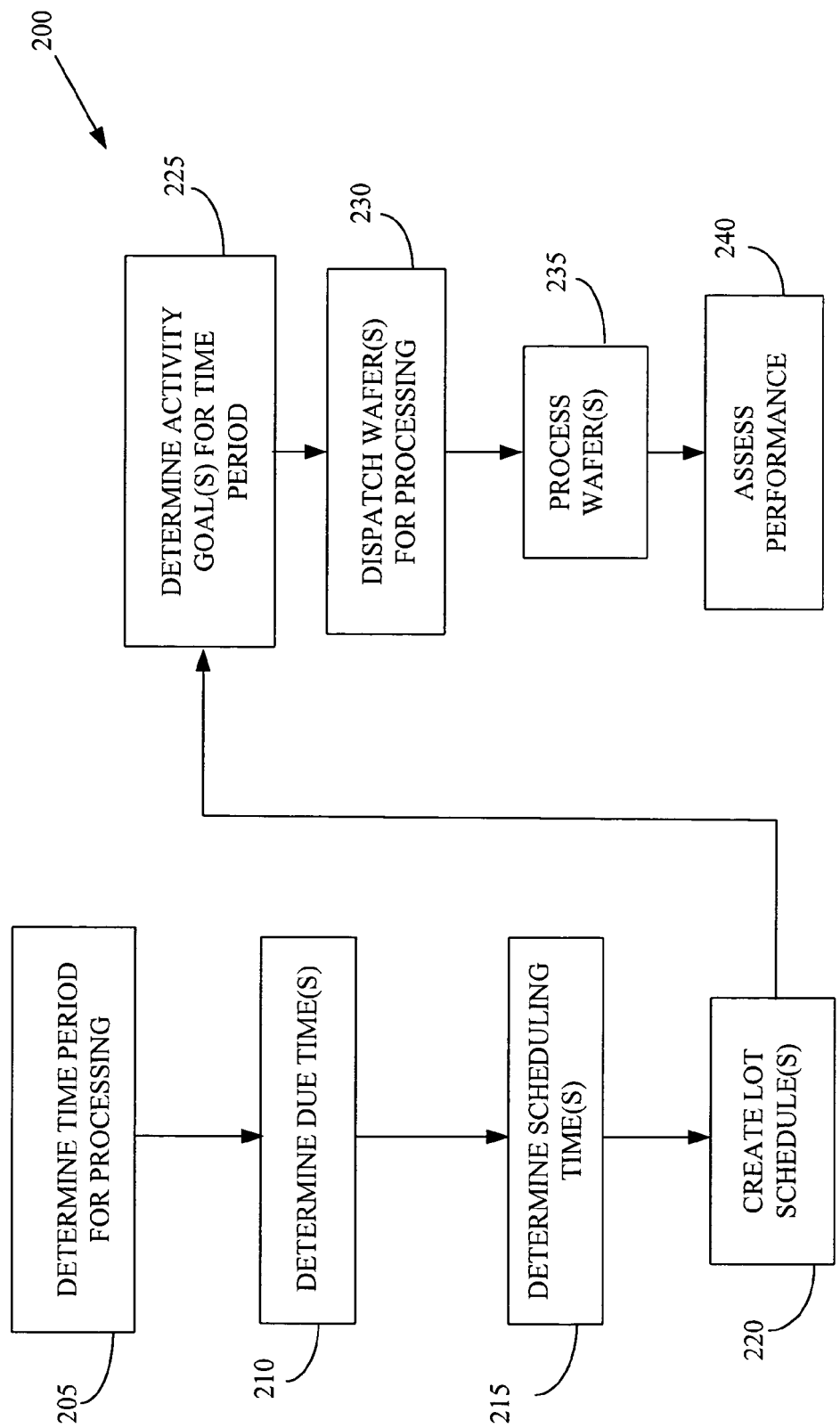
FIG. 2 conceptually illustrates one exemplary embodiment of a method for work-in-process management in a semiconductor fabrication facility, in accordance with the present invention.

FIG. 2 conceptually illustrates one exemplary embodiment of a method 200 for work-in-process management in a semiconductor fabrication facility. A time period for processing one or more wafers, wafer lots, or batches thereof, may be determined (at 205). In one embodiment, the determined (at 205) time period corresponds to a work period or shift of the semiconductor fabrication facility, such as a 12-hour work shift. In one embodiment, due dates for one or more wafer lots may also be determined (at 210). For example, individual lot schedules may be established by setting due dates for each lot and/or each operation performed by one or more processing tools, such as the processing tools 110, 115, 120, 125 shown in FIG. 1. Wafers and/or wafer lots may be prioritized based on the lot schedules.

In one embodiment, a scheduling time period may also be determined (at 215). Additional wafers and/or wafer lots may be scheduled during the determined (at 215) scheduling time period even though they may not be processed during the time period determined (at 205) for processing one or more wafers, wafer lots, or batches thereof. A scheduling one or more lots during the time period determined (at 215), the management unit may be aware of future processing of wafers and/or wafer lots so that lots that are being processed in the current time period (e.g., lots processed during the time period determined at 205) may be prioritized based on the expected future processing of these or other lots. In one embodiment the scheduling time period may be determined (at 215) to include the next 48 hours.

One or more lot schedules may be created (at 220) for the determined (at 205) time period. In one embodiment, the lot schedules indicate when one or more operations should be performed upon one or more wafers and/or wafer lots. In various alternative embodiments, the lot schedules may be determined (at 220) based on one or more factors associated with operations and/or the processing tools used to perform these operations. For example, the lot schedules may be determined (at 220) based upon a plan ratio, which is defined as a percentage of a plan queue time at which a lot must run to make its due date. Lot schedules may also be determined (at 220) based upon the number of days a particular lot is ahead and/or behind schedule, the proximity of a lot to a destination operation for the determined time period, or the "height" of a particular work-in-process operation (e.g., lots at high WIP operations may be given higher priorities). Additional priority may be given to wafers and/or wafer lots that are not far enough ahead of schedule and due at an earlier date, or to wafers and/or wafer lots that are too far behind schedule and due at a later date. Since due dates are assigned by shift throughout the week, this factor may help equalize the number of wafers and/or wafer lots that are shipped during each shift. Additional priority may also be given to wafers and/or wafer lots that are under a given desired minimum drum level, which may help maintain a minimum level of work-in-process moving and may help prevent the system from overcorrecting too quickly. Additional priority may also be given to wafers and/or wafer lots as the wafers and/or lots get closer to queue time limits.

In alternative embodiments, additional factors may also be considered when determining (at 220) the lot schedules. In one embodiment, lot grouping may be considered. For example, a minimum number of lots of a device at a particular operation may be specified so that the system may try to group the devices together. This may be used in photolithography to increase cascading and/or to reduce reticle changes. If a minimum number of lots associated with a device are not available for a shift, the lots may only be required if nothing else will be available or if no more lots of the same device are expected within a given time. The lots may not always be requested if the rule is set up to force the minimum to be met. In another embodiment, lot batching may be considered. For example, lots that do not form a complete batch may be de-prioritized. The de-prioritized lots may only be requested if no more lots associated with a recipe are expected within a given time period or if nothing else is expected to be available to run during a shift. In yet another embodiment, a development and/or experiment lot factor may be considered. For example, a factor indicating an effective amount of production capacity that may be required to run a development and/or experiment lot may be specified. The factor may be used in areas of the production floor where a one-to-one trade-off between production and development/experiment may not be assumed for a particular material.

Lower priority lots may be pushed to later shifts if the total activity requirement (as indicated by one or more of the lot schedules) for a station family exceeds the capacity of the station family. For example, lower priority lots may be pushed to later shifts until the total activity requirement is approximately equal to the capacity of the station family. Lot schedules may also be adjusted based on which lots are pushed out and which lots may be pulled in to try and maximize usage of the available capacity.

One or more activity goals may be determined (at 225) for the determined (at 205) time period. In the illustrated embodiment, the activity goals may be determined (at 225) based on one or more of the lot schedules. For example, an activity goal for a station family, tool set, or module, may be determined (at 225) based on the number of operations that the lot schedule indicates that the station family, tool set, or module is expected to perform during the determined time period.

FIG. 3 conceptually illustrates one exemplary embodiment of a status report 300. In the illustrated embodiment, the status report 300 includes activity goals 305 for a plurality of modules 310. The status report 300 has been generated during the current shift and the activity goals 305 in the status report 300 are for the current shift. For example, the status report 300 indicates that an Advanced Defect Inspection (ADI) module has an activity goal of 47,812 operations, a Contamination Free Manufacturing (CFM) module has an activity goal of 55,879 operations, a diffusion module has an activity goal of 28,359 operations, an etch module has an activity goal of 50,037 operations, an implant module has an activity goal of 49,830 operations, a masking module has an activity goal of 17,745 operations, a polish module has an activity goal of 28,562 operations, and a thin-film module as an activity goal of 29,732 operations.

Referring back to FIG. 2, one or more wafers 105 may be dispatched (at 230) for processing. In one embodiment, the one or more wafers 105 may be dispatched (at 230) based on the lot schedule and/or plan determined (at 220) based on said one or more due times and the determined time period for processing. The one or more wafers 105 are then processed (at 235). For example, the one or more wafers 105 may be processed (at 235) using one or more processing tools, such as the processing tools 110, 115, 120, 125 shown in FIG. 1. The performance of the processing tools may be assessed (at 240) during and/or after processing (at 235) of the wafers 105.

Figure 4:
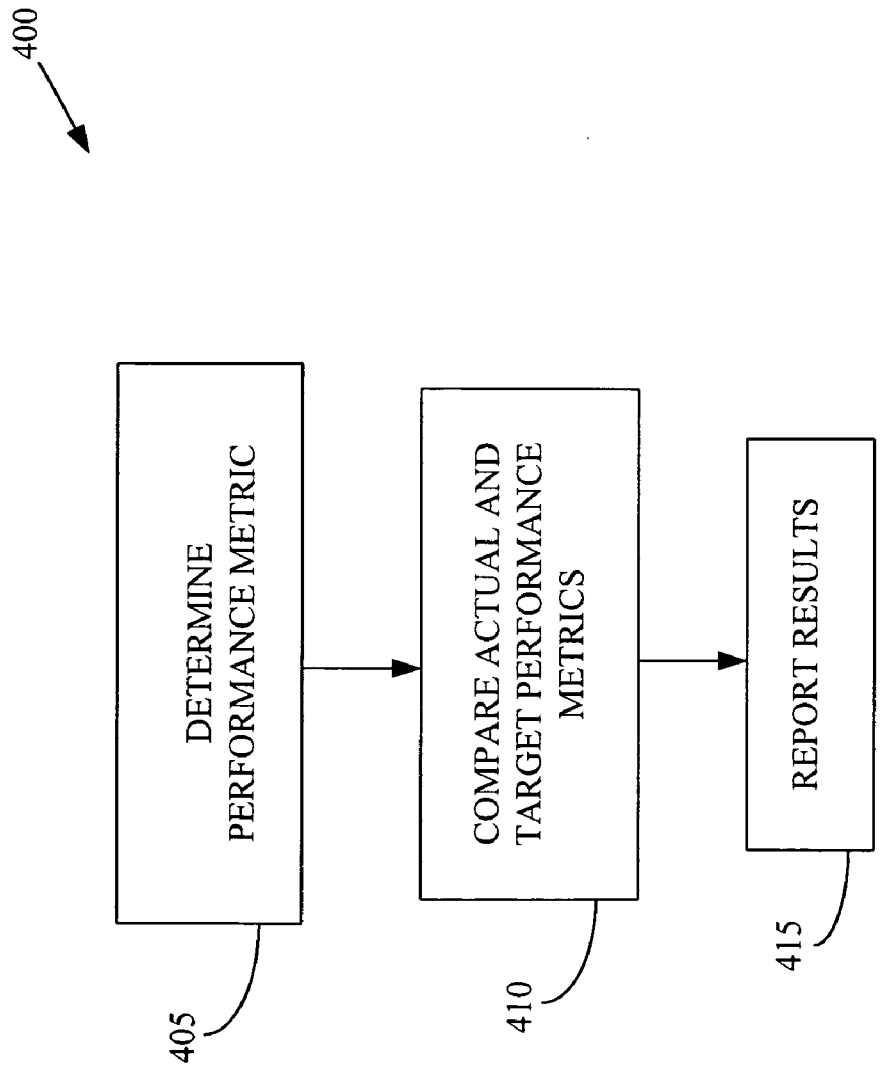
FIG. 4 conceptually illustrates one exemplary embodiment of a method of assessing performance of a manufacturing system, such as the manufacturing system shown in FIG. 1, in accordance with the present invention.

FIG. 4 conceptually illustrates one exemplary embodiment of a method 400 of assessing performance of a manufacturing system, such as the manufacturing system 100 shown in FIG. 1. In the illustrated embodiment, one or more performance metrics are determined (at 405). For example, the performance metric may be set equal to a sum of actual shift activities associated with a wafer and/or operation(s) performed on the wafer by a processing tool (or a group of tools such as a station family, a tool set, a module, and the like) divided by a sum of the required shift activities (e.g., an activity goal) associated with the wafer and/or the operation performed on the wafer. This performance metric may be referred to as a hit rate. Determining (at 405) the one or more performance metrics may include determining a target value for the performance metrics. For example, a target value of the hit rate performance metric may be 100%.

The performance metric values may be compared (at 410) to the target value for the performance metric. In one embodiment, a management unit such as the management unit 130 shown in FIG. 1 collects information regarding the actual number of shift activities associated with the wafer (and/or operations performed on the wafer) from one or more tools, such as the processing tools 110, 115, 120, 125 shown in FIG. 1, or groupings of tools. The collected information may then be used to determine the performance metric, such as a value of a hit rate performance metric. In one embodiment, hit rate performance metrics may be calculated using a weighted average of lower-level hit rate performance metrics. For example, a module hit rate may be determined using a weighted average of operation hit rates, device hit rates, type hit rates, station family hit rates, and the like. The actual and target performance metric values may then be compared (at 410), and the results may be reported (at 415). For example, the results may be reported (at 415) by providing a chart to an engineer and/or a production manager.

Figure 5:
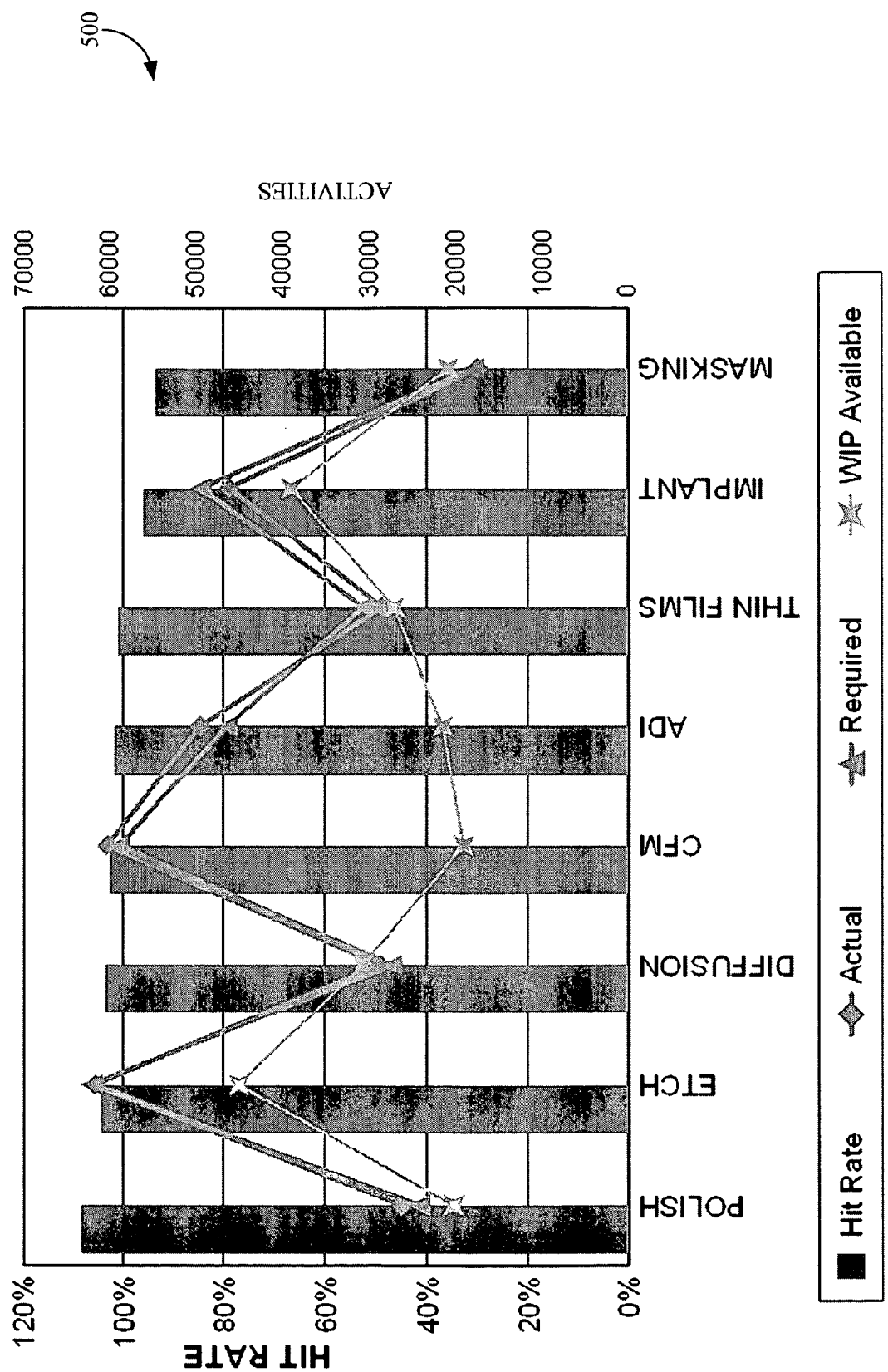
FIG. 5 shows one exemplary embodiment of a chart reporting results of a performance assessment, in accordance with the present invention.

FIG. 5 shows one exemplary embodiment of a chart 500 reporting results of a performance assessment. The horizontal axis in FIG. 5 indicates different modules of the manufacturing system. The left-hand vertical axis indicates a hit rate associated with each of the modules, and the right-hand vertical axis indicates a number of activities associated with each of the modules. In the illustrated embodiment, hit rate performance metrics are reported for a variety of modules and the modules are sorted according to their hit rate. For example, a polish module achieved a hit rate of more than 100% and is plotted furthest to the left, whereas a masking module achieved a hit rate of less than 100% and is plotted furthest to the right. FIG. 5 also shows the required activity goals associated with each module and the actual activity levels achieved by each module for the selected time period. For example, the polish module had a required activity goal of approximately 20,000 operations and achieved an actual activity level of slightly more than 20,000 operations. The masking module had a required activity goal of approximately 18,000 operations and achieved an actual activity level of approximately 15,000 operations.

Figure 6:
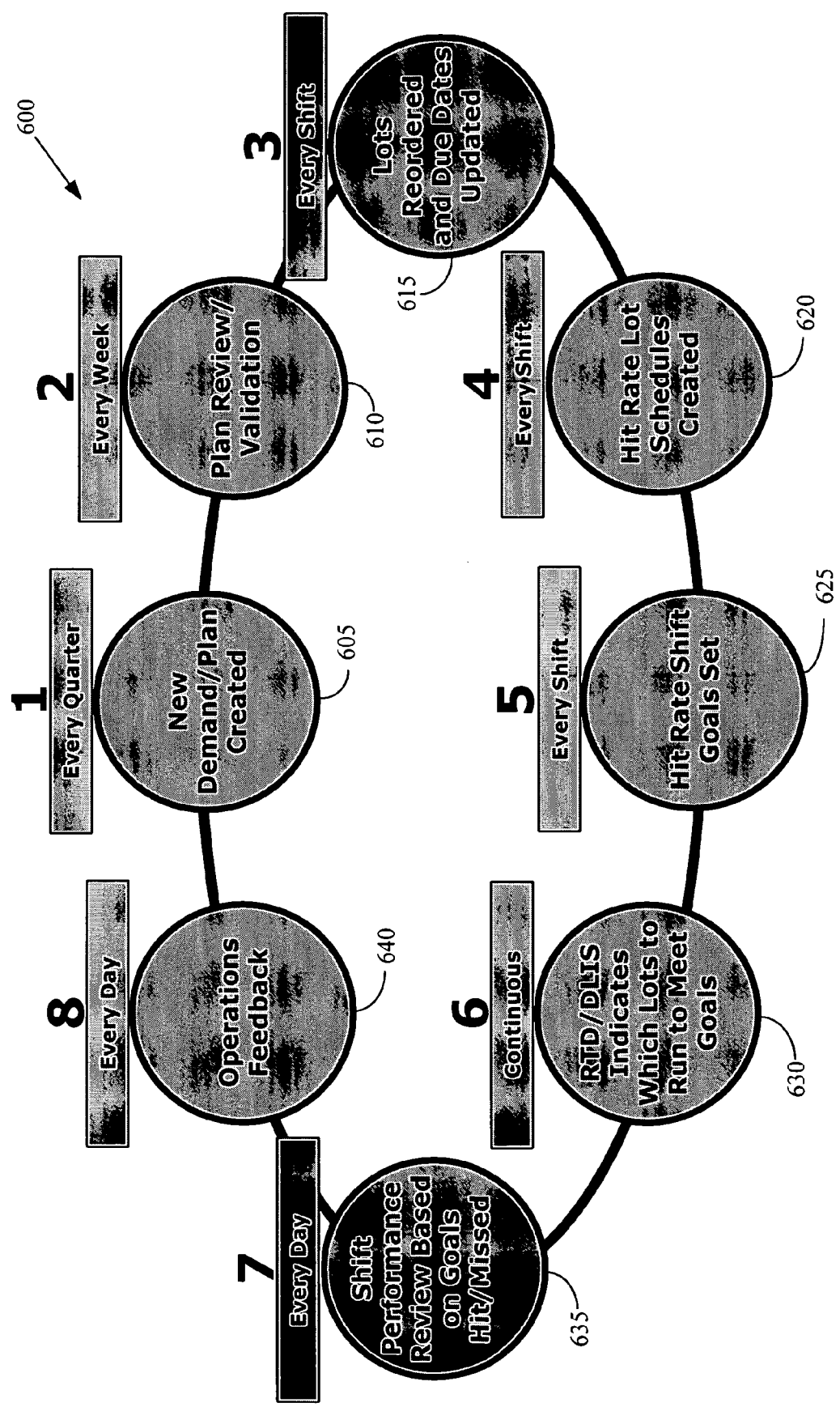
FIG. 6 conceptually illustrates one exemplary embodiment of a closed loop management system that may be used to schedule processing and/or dispatch wafers for processing, in accordance with the present invention.

FIG. 6 conceptually illustrates one exemplary embodiment of a closed loop management system 600 that may be used to schedule processing and/or dispatch wafers for processing. In the illustrated embodiment, a demand and/or plan for processing one or more wafers using one or more processing tools is developed (at 605). New demands and/or plans for processed semiconductor devices may be created approximately every quarter, e.g., approximately once every three months, as indicated in FIG. 6. In one embodiment, the plan may be reviewed and/or validated (at 610) approximately every week. For example, an engineer and/or manager may review and/or validate (at 610) the demands and/or plans on a weekly basis.

Wafers and/or wafer lots may be reordered (at 615) approximately every shift, and due dates associated with the wafers and/or wafer lots may be updated (at 615) when the wafers and/or wafer lots are reordered (at 615). Hit rate performance lot schedules may be created (at 620) and activity goals associated with the hit rate performance metric may be set (at 625) for the current shift. For example, a management unit may determine hit rates for the plurality of processing tools that may be used to process one or more wafers during the current shift, as discussed in detail above. A Real Time Dispatch (RTD) and/or a Dispatch List (DLIS) may be used to monitor processing and to determine (at 630) which lots should be run to meet one or more of the activity goals. Determining (at 630) which lots to run may occur substantially continuously.

Performance metrics associated with the processing tools may be determined and compared to the actual performance of the manufacturing system, as discussed in detail above. Performance review reports may then be provided and reviewed (at 635) by one or more engineers and/or managers. In the illustrated embodiment, the performance review reports are reviewed on a daily basis and feedback may be provided (at 640) based upon these reviews. The feedback that is provided (at 640) on approximately a daily basis may be accumulated and used to create and/or modify (at 605) the demand and/or plan for the next quarter. In one embodiment, the closed loop management system 600 may be a work-in-process management system that utilizes loose scheduling and dispatching. A loose schedule sets required lot completion times but does not consider resources associated with processing. For example, a loose schedule may specify operations that should be performed during a particular time period, but may not specify which tools should be used to perform the processing or other operations.

One or more embodiments of the techniques described above may have number of advantages over conventional work-in-process management. For example, a closed loop WIP management system may set goals, execute to reach the goals, and measure performance against the goals using a combination of loose scheduling and dispatching for WIP management. Creating a loose schedule allows for factory goals to be set based on what is needed from the factory without the influence of temporary restrictions and exceptions, which may unnecessarily cause actual performance to be reduced. As discussed above, production goals may be set and/or modified every shift at the operation, wafer, owner, priority, and experiment level. Tool capacity and certain exceptions, such as the number of reticles available, batch sizes, and development and experiment time requirements, may be considered in the loose schedule when they are understood and accepted as real constraints. The loose schedule may also incorporate decision logic that is conventionally handled by dispatch rules. Lot priorities, due dates, line balance, development needs, queue times, batching, and the like may also be comprehended in the schedule logic when determining how far each lot should move each shift. This allows for the goals to be evaluated and the results projected before execution even begins.

The dispatch rules may allow tools to be assigned lots to run based on what the tools can run, as well as what lots may be required and/or which lots may be earliest to complete. Schedule updates may also be made at shorter intervals (relative to the time period defined by the performance unit or management unit) to update information, such as when lots are expected to arrive and complete, given their current position in the line. With this updated schedule, required completion times may be maintained while expected completion times may be updated, allowing for both the required and expected completion times to be used when making real-time decisions throughout the schedule period. Setting goals based on the loose schedule and using a dispatch system designed to meet the goals can enable creation of a multitude of performance metrics that can be used to compare actual performance to desired performance for whatever time period is desired. Performance metrics and/or reports that are generated based on the performance metrics may then be used to highlight good and bad performance across shifts, toolsets, operations, wafers, and more. By analyzing these reports, operational issues can be identified and addressed to help improve factory performance.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of operating a semiconductor fabrication facility including a plurality of processing tool modules, comprising:
   determining a time period associated with processing of at least one wafer by said plurality of processing tool modules;

determining at least one due time associated with processing of said at least one wafer by said plurality of processing tool modules;

scheduling said at least one wafer for processing by said plurality of processing tool modules based on the time period and said at least one due time; and determining, in response to processing of said at least one wafer, a ratio of a number of activities performed by each processing tool module to an activity goal for each processing tool module.

2. The method of claim 1, wherein determining the time period comprises determining a time period associated with a shift at a semiconductor fabrication facility.

3. The method of claim 1, wherein scheduling said at least one wafer for processing comprises scheduling said at least one wafer for processing based upon at least one of said due time associated with said at least one wafer, a scheduling time period, a queue time associated with at least one processing tool, and congestion associated with said at least one processing tool.

4. The method of claim 1, wherein scheduling said at least one wafer for processing comprises scheduling said at least one wafer for processing based upon at least one priority associated with said at least one wafer.

5. The method of claim 1, wherein scheduling said at least one wafer for processing comprises scheduling said at least one wafer for processing based upon at least one of a due date associated with said at least one wafer, a plan ratio, how far said at least one wafer is ahead or behind schedule, proximity to a destination operation, height of a work-in-process operation, a shipping date associated with said at least one wafer, a drum percentage, a queue time associated with said at least one wafer, a lot grouping, a lot batching, a development lot factor, and an experiment lot factor.

6. The method of claim 1, further comprising determining said at least one activity goal for each processing tool module during the determined time period.

7. The method of claim 6, wherein determining said at least one activity goal comprises determining at least one activity goal based upon said scheduling of said at least one wafer for processing.

8. The method of claim 6, comprising dispatching said at least one wafer based on the scheduling of said at least one wafer.

9. The method of claim 8, comprising processing said at least one wafer.

10. The method of claim 9, further comprising determining the number of activities performed by each processing tool module.

11. The method of claim 10, further comprising determining at least one performance metric associated with said at least one activity goal and the number of activities performed during processing of said at least one wafer.

12. The method of claim 11, wherein determining said at least one performance metric comprises determining said at least one ratio of said at least one activity goal to the number of activities performed during processing of said at least one wafer.

13. The method of claim 11, further comprising providing information indicative of the performance metric.

14. An apparatus, comprising:

means for determining a time period associated with processing of at least one wafer by a plurality of processing tool modules;

means for determining at least one due time associated with processing of said at least one wafer by said plurality of processing tool modules;

means for scheduling said at least one wafer for processing by said plurality of processing tool modules based on the time period and said at least one due time; and means for determining, in response to processing of said at least one wafer, a ratio of a number of activities performed by each processing tool module to a target activity goal for each processing tool module.

15. An apparatus for use with a semiconductor fabrication facility including a plurality of processing tool modules, comprising:

a management unit configured to:

determine a time period associated with processing of at least one wafer by said plurality of processing tool modules;

determine at least one due time associated with processing of said at least one wafer by said plurality of processing tool modules; and schedule said at least one wafer for processing by said plurality of processing tool modules based on the time period and said at least one due time; and determining, in response to processing of said at least one wafer, a ratio of a number of activities performed by each processing tool module to a target activity goal for each processing tool module.

16. The apparatus of claim 15, wherein the management unit is configured to determine a time period associated with a shift at a semiconductor fabrication facility.

17. The apparatus of claim 15, wherein the management unit is configured to schedule said at least one wafer for processing based upon at least one of said due time associated with said at least one wafer, a scheduling time period, a queue time associated with at least one processing tool, and congestion associated with said at least one processing tool.

18. The apparatus of claim 15, wherein the management unit is configured to schedule said at least one wafer for processing based upon at least one priority associated with said at least one wafer.

19. The apparatus of claim 15, wherein the management unit is configured to schedule said at least one wafer for processing based upon at least one of a due date associated with said at least one wafer, a plan ratio, how far said at least one wafer is ahead or behind schedule, proximity to a destination operation, height of a work-in-process operation, a shipping date associated with said at least one wafer, a drum percentage, a queue time associated with said at least one wafer, a lot grouping, a lot batching, a development lot factor, and an experiment lot factor.

20. The apparatus of claim 15, wherein the management unit is configured to determine at least one activity goal associated with processing during the determined time period.

21. The apparatus of claim 15, wherein the management unit is configured to determine at least one activity goal based upon said scheduling of said at least one wafer for processing.

22. The apparatus of claim 21, wherein the management unit is configured to dispatch said at least one wafer based on the scheduling of said at least one wafer.

23. The apparatus of claim 21, wherein the management unit is configured to determine the number of activities performed by each of the plurality of processing tool modules.

24. The apparatus of claim 23, wherein the management unit is configured to determine at least one performance metric associated with said at least one activity goal and the number of activities performed during processing of said at least one wafer.

25. The apparatus of claim 24, wherein the management unit is configured to determine said at least one ratio of said at least one activity goal to the number of activities performed during processing of said at least one wafer.

26. The apparatus of claim 24, wherein the management unit is configured to provide information indicative of the performance metric.

* * * * *